United States Patent [19]

Allen et al.

[11] Patent Number: 5,510,190
[45] Date of Patent: Apr. 23, 1996

[54] RADIATION-CURABLE RELEASE COMPOSITIONS

[75] Inventors: John Allen, Yorba Linda; Qun Yu, Los Angeles, both of Calif.

[73] Assignee: Avery Dennison Corporation, Pasadena, Calif.

[21] Appl. No.: 394,572

[22] Filed: Feb. 27, 1995

[51] Int. Cl.$^6$ .............................. B32B 9/04; B32B 9/06; C08F 283/12
[52] U.S. Cl. .................. 428/448; 428/447; 428/449; 522/99; 525/477
[58] Field of Search .................. 525/477; 522/99; 428/448, 449, 447

[56] References Cited

U.S. PATENT DOCUMENTS

| | | | |
|---|---|---|---|
| 2,676,182 | 4/1954 | Daudt et al. | 260/448.2 |
| 2,857,356 | 10/1958 | Goodwin | 260/42 |
| 3,726,710 | 4/1973 | Berger et al. | 522/99 |
| 4,087,478 | 5/1978 | Keil | 260/82.5 |
| 4,125,470 | 11/1978 | Fenton et al. | 252/27 |
| 4,201,808 | 5/1980 | Cully et al. | 428/40 |
| 4,421,904 | 12/1983 | Eckberg et al. | 528/27 |
| 4,518,727 | 5/1985 | Traver | 524/35 |
| 4,547,431 | 10/1985 | Eckberg | 428/413 |
| 4,554,296 | 11/1985 | Keil | 521/154 |
| 4,568,566 | 2/1986 | Tolentino | 427/54.1 |
| 4,576,999 | 3/1986 | Eckberg | 525/476 |
| 4,617,238 | 10/1986 | Crivello et al. | 428/452 |
| 4,624,198 | 11/1986 | Keil | 525/476 |
| 4,675,346 | 6/1987 | Lin et al. | 522/39 |
| 4,678,846 | 7/1987 | Weitemeyer et al. | 525/477 |
| 4,952,657 | 8/1990 | Riding et al. | 528/27 |
| 5,198,476 | 3/1993 | Kobayashi et al. | 522/31 |
| 5,217,805 | 6/1993 | Kessel et al. | 428/352 |
| 5,240,971 | 8/1993 | Eckberg et al. | 522/31 |
| 5,279,860 | 1/1994 | Griswold et al. | 427/386 |
| 5,310,601 | 5/1994 | Riding | 428/429 |
| 5,332,797 | 7/1994 | Kessel et al. | 528/27 |
| 5,360,833 | 11/1994 | Eckberg et al. | 522/31 |

FOREIGN PATENT DOCUMENTS 59-64669  4/1984  Japan .

OTHER PUBLICATIONS

G E Silicones, SL5000 Solventless Release Coating System, General Electric Company, 1991.

Wilson, "MQ Silicone Resins", PCR Report, PCR Incorporated, Aug. 1991.

*Primary Examiner*—Ralph H. Dean
*Assistant Examiner*—Margaret W. Glass
*Attorney, Agent, or Firm*—Renner, Otto, Boisselle & Sklar

[57] ABSTRACT

A radiation-curable release composition is disclosed which comprises:

(A) an organopolysiloxane represented by the formula $$RSi(CH_3)_2-O-(Si(CH_3)_2O)_n(Si(CH_3)(R)O)_mSi(CH_3)_2R \quad (I)$$

wherein in Formula (I), each R is $-R^1-O(O)C-C(R^2)=CH_2$, $-R^1-O-C(R^2)=CH_2$ or $$-R^1-\underset{O}{\underset{\diagdown\diagup}{C(R^2)-C(R^2)}}-C(R^2)=CH_2$$

$R^1$ is a hydrocarbylene group; each $R^2$ is independently hydrogen or a methyl or ethyl group; m is a number from about 1 to about 15; and n is a number from about 50 to about 300; and (B) an organosiloxane polymer represented by the formula $$(R_3SiO)(Si(CH_3)_2O)_n(SiR_3)$$

wherein in Formula (II), each R is independently a hydrocarbon group and n is a number in the range of about 1000 to about 20,000. A method of producing release-coated substrates, the release-coated articles thus produced, and multi-layer articles or constructions incorporating a release layer also are disclosed. When the release compositions are cured such as by radiation, the cured compositions exhibit a desirable high and controlled release force at high speeds such as the speeds utilized in label processing.

20 Claims, No Drawings

RADIATION-CURABLE RELEASE COMPOSITIONS

TECHNICAL FIELD OF THE INVENTION

This invention relates to silicone-containing release coating compositions. More particularly, this invention relates to radiation-curable silicone-containing release compositions which contain (A) a low viscosity, radiation-curable functional silicone polymer, and (B) a high viscosity silicone polymer.

BACKGROUND OF THE INVENTION

Radiation-curable silicone coatings for release of pressure-sensitive adhesives are known. For example, ultraviolet-curable silicone compositions containing acrylic functional silicone polymers are taught in U.S. Pat. Nos. 4,201,808 and 4,678,846. In addition, silicone-release compositions containing ultraviolet curable epoxy-functional silicones are taught in U.S. Pat. No. 4,421,904. Each of these systems, as well as others based upon similar or related chemistries, produce release substrates exhibiting specific and useable ranges of release performance.

However, there are other significant applications, such as that of industrial labeling operations, for which the release performance ranges of such systems are not as ideal. Often, the release performance of these radiation-curable silicone compositions are found to depend upon the type of pressure-sensitive adhesive being used in the construction of the label. For that reason it is sometimes necessary to be able to raise the release force, i.e., tighten the release.

Extensive efforts have been made to achieve the objective of extending the release performance range of these systems to higher values. For example, U.S. Pat. No. 4,568,566 discusses the use of acrylic functional silicone resins in UV-curable acrylic functional polymers. In addition, numerous patents have been fried for those systems employing UV-curable epoxy functional polymers. U.S. Pat. Nos. 4,547,431 and 5,217,805 discuss the use of polyfunctional epoxy monomers as control release additives (CRAs) and U.S. Pat. No. 4,952,657 teaches modification of UV-curable epoxy-functional silicones with pendant attached phenolic groups. Several other patents focus on the use of various forms of functionalized MQ resins having methyl and/or alkenyl (U.S. Pat. No. 5,198,476), or epoxy (U.S. Pat. Nos. 5,279,860; 5,310,601; and 5,360,833) groups in the UV-curable epoxy-functional silicone polymer.

While each of these approaches have provided the capability to control upward the release force of the acrylic, epoxy, and vinylether functionalized radiation-curable silicone systems noted above, none of these efforts have been successful in lowering the release force below that which is the normal minimum for each of these radiation-curable silicone compositions. And often, that minimum release force is above what has come to be known as the premium release level.

In non-radiation cure silicone-release coating compositions, premium release in such coatings is characteristic of the base silicone polymer. Thermal cure versions of these polymers are generally standard polydimethylsiloxanes which have been terminated with either vinyl or silanic hydrogen reactive groups, or they are copolymers of polydimethyl, methylvinylsiloxane. These copolymers can also be terminated with vinyl reactive groups as in the case of the standard polydimethylsiloxanes. The natural premium release behavior of these polymers make them potential candidates for blends into radiation-curable silicones.

SUMMARY OF THE INVENTION

A radiation-curable release composition is disclosed which comprises:

(A) an organopolysiloxane represented by the formula

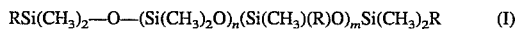

wherein in Formula (I), each R is —R$^1$—O(O)C—C(R$^2$)=CH$_2$, —R$^1$—O—C(R$^2$)=CH$_2$ or

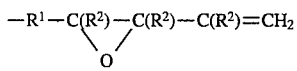

R$^1$ is a hydrocarbylene group; each R$^2$ is independently hydrogen or a methyl or ethyl group; m is a number from about 1 to about 15; and n is a number from about 50 to about 300; and (B) an organosiloxane polymer represented by the formula $$(R_3SiO)(Si(CH_3)_2O)_n(SiR_3) \qquad (II)$$

wherein in Formula (II), each R is independently a hydrocarbon group and n is a number in the range of about 1000 to about 20,000. A method of producing release-coated substrates, the release-coated articles thus produced, and multi-layer articles or constructions incorporating a release layer also are disclosed. When the release compositions are cured such as by radiation, the cured compositions exhibit a desirable high and controlled release force at high speeds such as the speeds utilized in label processing.

DESCRIPTION OF THE PREFERRED EMBODIMENTS

The organopolysiloxane (A) can be represented by the formula

wherein in Formula (I) each R is —R$^1$—O(O)C—C(R$^2$)=CH$_2$, —R$^1$—O—C(R$^2$)=CH$_2$ or

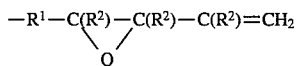

R$^1$ is a hydrocarbylene group; each R$^2$ is independently hydrogen or a methyl or ethyl group; m is a number from about 1 to about 15, and in one embodiment from about 2 to about 10; and n is a number from about 50 to about 300, and in one embodiment from about 120 to about 150, and in one embodiment about 75 to about 125. R can be an acrylate, epoxy or vinyl ether group. In one embodiment, R is —(CH$_2$)$_6$OC(O)—CH=CH$_2$. In one embodiment, R is 4-vinyl cyclohexene epoxide. The hydrocarbylene group R$^1$ may be a divalent aliphatic, cycloaliphatic or aromatic group containing up to about 10 carbon atoms, and specific examples of hydrocarbylene groups include a methylene, ethylene, propylene, butylene, hexylene, heptylene, cyclohexene, phenylene, etc. R$^1$ can be an alkylene of 1 to about 10 carbon atoms. Generally, R$^2$ is hydrogen. The organopolysiloxanes of Formula (I) may contain from 3 to about 17 R groups since m is defined as from about 1 to about 15. Thus, the value of m determines the amount of acrylate, epoxy or vinyl ether present in the organopolysiloxanes (A).

The acrylic functional organopolysiloxanes (A) can be prepared, for example, by reacting a siloxane containing hydroxy groups or epoxy groups with acrylic acid or methacrylic acid. The siloxanes containing the 2-hydroxy-1-oxypropylene group can be prepared by reacting a reactive siloxane (e.g., containing halogen) with a polyhydroxy compound such as ethylene glycol, propylene glycol, glycerol, or pentaerythritol.

The epoxy functional organopolysiloxanes (A) can be prepared, for example, by a platinum catalyzed hydrosilation addition reaction between hydrogen atoms on the chain of a polydimethyl-methylhydrogen siloxane copolymer with organic molecules containing both ethylenic unsaturation and epoxide functionality, such as 4-vinylcyclohexene oxide.

The vinyl ether functional organopolysiloxanes (A) can be prepared, for example, by a platinum catalyzed hydrosilation addition reaction between hydrogen atoms on the chain of a polydimethyl-methylhydrogen siloxane copolymer with organic molecules containing two or more ethylenic unsaturated functional groups, such as 1,4-butanediol divinyl ether and trimethylolpropane trivinyl ether.

The organopolysiloxanes (A) are known in the art, and various methods for producing such organopolysiloxanes are described in a number of patents. In particular, the disclosures of U.S. Pat. Nos. 4,908,274 and 4,963,438 are hereby incorporated by reference for their disclosure of acrylate or methacrylate containing organopolysiloxanes and methods of preparing such organopolysiloxanes. The disclosure in U.S. Pat. No. 4,421,904 is hereby incorporated by reference for its disclosure of epoxy-containing organopolysiloxanes and methods of preparing such organopolysiloxanes.

Organopolysiloxanes of the type represented by Formula (I) containing acryloxy groups are available commercially from, for example, Goldschmidt Chemical Corp., Hopewell, Va. Goldschmidt's silicone acrylate series include dimethylpolysiloxanes available under the general trade designation TERGO®RC. A particular example of a useful polysiloxane is available under the designation of RC- 726. RC-726 is believed to be characterized by Formula (I) wherein each R is —(CH$_2$)$_6$OC(O)CH=CH$_2$, m is 6, and n is about 136. The molecular weight of RC- 726 is about 11,000. This organopolysiloxane contains about 9% by weight of acrylate.

In one embodiment, the organopolysiloxane is a compound represented by Formula (I) wherein each R is —(CH$_2$)$_6$OC(O)CH=CH$_2$, m is 2 and n is about 100. This material contains about 4% by weight acrylate. This material is referred to in Table I below as "Polymer A."

Organopolysiloxanes of the type represented by Formula (I) containing epoxy groups are available from General Electric Co., Waterford, N.Y. A particular example of a useful organopolysiloxane is available under the trade designation UV- 9315.

The radiation-curable release compositions of the present invention generally contain from about 80% to about 99% by weight of at least one organopolysiloxane (A). In one embodiment, the inventive release compositions contain about 90% to about 99% by weight of organopolysiloxane (A).

The organosiloxane polymer (B) is a compound represented by the formula

$$(R_3SiO)(Si(CH_3)_2O)_n(SiR_3) \quad (II)$$

wherein in Formula (II), each R is independently a hydrocarbon group; n is a number from about 1000 to about 20,000, and in one embodiment from about 5000 to about 15,000. These compounds can have average molecular weights of up to about 1,000,000. Each R in Formula (II) can be the same or different and can contain up to about 10 carbon atoms, and in one embodiment about 2 to about 6 carbon atoms. Each R can be independently an alkyl group such as methyl, ethyl, isopropyl, butyl or hexyl; an alkenyl group such as vinyl, allyl or hexenyl; an aryl group such as phenyl, tolyl or xylyl; an aralkyl group such as beta-phenylethyl or beta-phenylpropyl; a cycloaliphatic group such as cyclopentyl, cyclohexyl or cyclohexenyl; or an acrylic group such as acrylate or methacrylate. The polymer (B) may further comprise from 0.1% to 5% by weight of silicon-bonded hydroxyl groups and may contain trace amounts of silicon-bonded alkoxy groups such as methoxy, ethoxy or isopropoxy groups. The alkoxy groups can result from the particular method used to prepare the copolymer.

Polymers of the type represented by Formula (II) are sometimes referred to in the art as siloxane or silicone gums. Organosiloxane polymers and copolymers of this type are well known in the art. Briefly summarized, these copolymers can be prepared by the equilibrium reaction of cyclic octamethyl, tetra siloxane and divinyl, tetramethydisiloxane in the presence of catalytic amounts of potassium silaneolate.

An example of a commercially available copolymer of this type in which the R group is vinyl is available from GE Silicones under the trade designation SF-33. Other commercially available copolymers that are useful include: KE-76BS and KE-76VBS available from Shin Etsu Silicones, and RP-789 available from Rhone-Poulenc.

The radiation-curable release compositions of the present invention generally contain from about 1% to about 20% by weight of at least one organosiloxane polymer (B). In one embodiment, the inventive release compositions contain about 3% to about 10% by weight of organosiloxane polymer (B), and in one embodiment the concentration is from about 4% to about 9% by weight.

The radiation-curable release compositions of the present invention optionally may contain at least one photoinitiator (C). The amount of photoinitiator included in the compositions of the invention may range up to about 10%, more often up to about 5% by weight based on the total weight of the radiation-curable composition. A photoinitiator is incorporated into the curable compositions when compositions are to be cured by exposure to non-ionizing radiation such as ultraviolet light.

Suitable photoinitiators include those compounds that produce free radicals which operate to polymerize and cure the compositions used in this invention. Examples of photoinitiators which may be used in combination with ultraviolet light includes, for example, benzyl ketals, benzoin ethers, acetophenone derivatives, ketoxime ethers, benzophenone, benzo or thioxanthones, etc. Specific examples of photoinitiators include: 2,2-diethoxyacetophenone; 2- or 3- or 4-bromoacetophenone; benzoin; benzophenone; 4-chlorobenzophenone; 4-phenylbenzophenone; benzoquinone; 1-chloroanthroquinone; p-diacetyl-benzene; 9,10-dibromoanthracene; 1,3-diphenyl-2-propanone; 1,4-naphthyl-phenyl ketone; 2,3-pentenedione; propiophenone; chlorothioxanthone; xanthone; fluorenone; and mixtures thereof. An example of a commercially available photoinitiator of this type is available from the Ciba Geigy Corporation of Hawthorne, N.Y. under the tradename of Durocure 1173. A particularly effective photoinitiator capable of initiating epoxylated silicone curing reactions is UV 9380C available from General Electric Company of Waterford, N.Y.

The radiation-curable release compositions of the present invention are produced by mixing the above-described components. The components may be mixed at room temperature with stirring, and mild heating may be employed in some instances to facilitate mixing. Since the components of the composition may undergo some separation during storage, mild agitation or mixing just prior to use is effective to redisperse the components and is recommended.

The radiation-curable compositions of the present invention can be stabilized against premature polymerization during storage by the addition of conventional polymerization inhibitors such as hydroquinone, monomethylether of hydroquinone, phenothiazine, di-t-butyl paracresol, etc. Amounts of 0.1 weight percent or less of the stabilizers are generally effective.

Examples of useful radiation-curable compositions of the present invention are disclosed in the following Table I. Unless otherwise indicated, in the following examples and elsewhere in the specification and claims, all parts and percentages are by weight, temperatures are in degrees Celsius, and pressures are at or near atmospheric pressure. In Table I all numerical values are in parts by weight.

TABLE I

|  | Example No. | | | |
| --- | --- | --- | --- | --- |
|  | 1 | 2 | 3 | 4 |
| Polymer A | 92.5 | 85 | — | — |
| UV 9315 | — | — | 90 | 80 |
| KE-76VBS | 7.5 | 15 | 10 | 20 |
| Durocure 1173 | 3 | 3 | — | — |
| UV 9380C | — | — | 2 | 2 |

The radiation-curable release compositions of the present invention generally are applied to a substrate prior to curing. The compositions may be applied to a substrate as a coating by any conventional means known in the coating art such as roller coating, curtain coating, brushing, spraying, reverse roll coating, doctor knife, dipping, die coating, etc. In one particular embodiment, the liquid, radiation-curable compositions of the invention are applied to a substrate using offset gravure techniques. The liquid being applied to the substrate may be heated or cooled to facilitate the coating process and to alter the depth of the penetration of the liquid coated into the substrate prior to curing.

A variety of substrates can be coated with the radiation-curable release compositions of the present invention, and these compositions can be applied to any substrate when it is desirable to modify the release properties of a surface of the substrate. For example, the compositions of the present invention can be employed to form release coatings on substrates such as paper, vinyl, polyvinyl chloride films, polyester films, polyolefin films, non-woven fabrics, glass, steel, aluminum, etc. Included among the types of paper which can be used is paper, clay coated paper, glassinc, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 20 to about 150 pounds per ream are useful, and papers having weights in the range of from about 30 to about 60 pounds per ream are presently preferred. The term "ream" as used herein equals 3000 square feet. Examples of specific papers which can be utilized as substrates in preparing the composite laminates of the present invention include Kraft papers such as 40-pound and 50-pound bleached Kraft papers; 41-pound offset grade bleached Kraft paper; etc. The present invention is particularly useful in providing release characteristics to paper and polymeric films.

The amount of radiation-curable release compositions of the invention applied to the various substrates varies depending upon the characteristics of the substrate, the properties desired in the release coating, the radiation source utilized, and the particular formulation of the release composition. If an excess of the coating composition is applied to the substrate, the physical characteristics of the substrate may be affected in an undesirable manner. Also, for economic reasons, it is normally desired to apply the lowest amount of coating to obtain the desired result. Thus, applied coating weights may, depending on the substrate and intended use, range from about 0.1 to about 10 or more grams/m$^2$. In general, when it is desired to produce a release-coated paper useful as a protective cover for a pressure-sensitive adhesive tape, applied coating weights are from about 1 to about 3 grams/m$^2$. At these levels, desirable high release characteristics are obtained without distorting the essential components of the substrate so that a flat construction which has good performance in the end use can be produced.

The release compositions of the present invention can be cured by exposure to known forms of radiation, especially ultraviolet light. One of the advantages of using such radiation to effect cure of the composition is that polymerization takes place rapidly at ambient temperature, and heating is not necessary. The equipment for generating such radiation is well known to those skilled in the art.

Curing of the release compositions of the present invention can be effected in a continuous manner by passing the release-coated substrate through radiation equipment which is designed to provide the coated substrate with sufficient residence time to complete the cure of the coating. Curing may be effected in an air atmosphere or in an inert atmosphere such as nitrogen or argon. An inert atmosphere is preferred. The length of exposure necessary to cure the release compositions of the present invention varies with such factors as the particular formulation used, type and wavelength of radiation, dose rate, energy flux, concentration of photoinitiator (when required), the atmosphere and thickness of the coating. A total dosage of from about 0.2 to 10 megarads, preferably below 4 megarads is sufficient to cure the silicone release compositions. Generally, the exposure is quite brief and curing is completed in about 0.1 to about 3 seconds. The actual exposure time required to give proper curing for various release compositions can be readily determined by one skilled in the art with a minimum of experimentation. Excess curing of the release compositions should generally be avoided.

Substrates which have been coated with the release compositions of the present invention and cured exhibit desirable high and controlled release properties, the release coating is resistant to moisture and solvents, and the coating is thermally stable. As indicated previously, a substrate which is coated with the cured release composition of the present invention can be used as a protective covering for a second substrate having pressure-sensitive adhesive coating on its surface. The protective covering is normally applied to the adhesive-coated substrate by bringing the two coated substrates into surface-to-surface contact with the release coating on the first substrate in contact with the pressure-sensitive adhesive on the second substrate. Application of a slight pressure is usually effective to cause the coated substrates to adhere together forming a four-layered laminate. When a coated release paper prepared in accordance with the present invention is used as a protective covering on a pressure-sensitive adhesive tape, a desirable high-release force is required before the release-coated paper will separate from the adhesive tape, and there is little transfer of the silicone release coating from the paper onto the adhesive. The composition of the present invention is useful particularly to prepare coated papers which are useful in high-speed equipment such as labeling equipment where a high release force is desired at the high peel rates utilized.

Accordingly, the present invention contemplates the use of the compositions described above in the preparation of multi-layer articles or constructions comprising (a) a first substrate; (b) a second substrate; (c) a release layer comprising the release coating composition of this invention which has been cured by exposure to radiation; and (d) a layer comprising a pressure-sensitive adhesive composition, wherein the release layer (c) is interposed between the first substrate and the layer of pressure-sensitive adhesive and is preferentially adherent to the first substrate, and the pressure-sensitive adhesive layer (d) is interposed between the release layer and the second substrate and is preferentially adherent to the second substrate. Additional layers can be interdispersed between the first substrate and the layer of pressure-sensitive adhesive and between the second substrate and the release layer to provide additional desirable properties such as increased strength, increased dimensional stability, etc. As in other applications described above, the first and second substrates may comprise a variety of materials including paper, polyolefins, vinyl, polyester, aluminum, etc., although substrates such as vinyl, polyolefins and paper are preferred.

With reference to the multi-layered articles or constructions utilizing at least one layer of a pressure-sensitive adhesive composition, any pressure-sensitive adhesive composition known in the art can be utilized. Such adhesive compositions are described in, for example, "Adhesion and Bonding", *Encyclopedia of Polymer Science and Engineering*, Vol. 1, pages 476–546, Interscience Publishers, 2nd Ed. 1985. Such compositions generally contain an adhesive polymer such as natural, reclaimed or styrene-butadiene rubber, styrene butadiene or styrene isoprene block copolymers, polyisobutylene, poly(vinyl ether) or poly(acrylic) ester as a major constituent. Other materials may be included in the pressure-sensitive adhesive compositions such as resin tackifiers including, for example: rosin esters, oil-soluble phenolics, or polyterpenes; antioxidants; plasticizers such as mineral oil or liquid polyisobutylenes; and fillers such as zinc oxide or hydrated alumina. The selection of the pressure-sensitive adhesive to be used in any particular multi-layer article or construction is not critical to this invention, and those skilled in the art are familiar with many suitable pressure-sensitive adhesives. However, as known to those skilled in the art, the pressure-sensitive adhesive and the release layer should not chemically react.

The radiation-curable release compositions of this invention provide cured coatings and films which have excellent release characteristics, and when applied to a substrate such as paper, the coated paper exhibits improved dimensional stability under varying conditions such as temperature, humidity, aging, etc. A particularly desirable property of substrates such as paper which have been coated with the release compositions of this invention and constructions such as labels prepared therefrom is that they lay flat and remain flat over time, even when exposed to moisture and low or high temperatures. The surface characteristics of the coated construction allows for printing by laser printers providing good toner anchorage and printing by flexographic techniques, when used in combination with generally available primers, print inks and over-varnishes.

The release compositions of Examples 1–4 are applied to 40-pound Kraft paper at an approximate weight of one pound per ream. The coatings are cured by exposure to ultraviolet light. The coated side is then laminated under pressure to the adhesive side of a liner of 40-pound Kraft paper coated with one of the following adhesives:

Adhesive A—Rubber-based adhesive dissolved in solvent.

Adhesive B—Acrylic adhesive dissolved in solvent.

Adhesive C—Removable emulsion acrylic adhesive.

Adhesive D—Permanent emulsion acrylic adhesive.

After aging the laminate for three days at room temperature (i.e., about 23° C.), the release force, measured in grams per inch width, required to separate the laminates at the release coating-adhesive interface by pulling the tape from the liner at an angle of 90° is determined at a peel rate of 300 inches per minute. The results are summarized in Table II. In Table II, each numerical value is in grams of force per inch and is based on the average value for four test specimens.

TABLE II

| | Adhesive | | | |
|---|---|---|---|---|
| Example No. | A | B | C | D |
| 1 | — | — | 108.7 | 126 |
| 2 | — | — | 88.7 | 175.2 |
| 3 | 5.2 | 40.6 | 40.4 | 50.3 |
| 4 | 21.7 | 63.6 | 86.1 | 57.2 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A radiation-curable release composition, comprising:

(A) an organopolysiloxane represented by the formula $$RSi(CH_3)_2-O-(Si(CH_3)_2O)_n(Si(CH_3)(R)O)_mSi(CH_3)_2R \quad (I)$$

wherein in Formula (I), each R is $-R^1-O(O)C-C(R^2)=CH_2$, $-R^1-O-C(R^2)=CH_2$ or

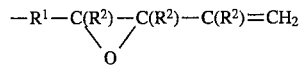

$R^1$ is a hydrocarbylene group; each $R^2$ is independently hydrogen or a methyl or ethyl group; m is a number from 1 to about 15; and n is a number from about 50 to about 300; and (B) an organosiloxane polymer represented by the formula $$(R_3SiO)(Si(CH_3)_2O)_n(SiR_3) \quad (II)$$

wherein in Formula (II), each R is independently a hydrocarbon group and n is a number in the range of about 1000 to about 20,000.

2. The composition of claim 1 wherein said composition further comprises (C) a photoinitiator.

3. The composition of claim 1 wherein in Formula (I), $R^1$ is an aliphatic, cycloaliphatic or aromatic group of up to about 10 carbon atoms.

4. The composition of claim 1 wherein in Formula (I), each $R^2$ is hydrogen.

5. The composition of claim 1 wherein R is 4-vinyl cyclohexene epoxide.

6. The composition of claim 1 wherein R is vinyl ether.

7. The composition of claim 1 wherein in Formula (II), n is a number in the range of about 5,000 to about 15,000.

8. The composition of claim 1 wherein in Formula (II), each R group contains up to about 10 carbon atoms.

9. The composition of claim 1 wherein in Formula (II), each R group is an alkyl group of about 2 to about 6 carbon atoms.

10. The composition of claim 1 wherein (B) is a silicone gum.

11. The composition of claim 2 wherein said photoinitiator (C) is a compound selected from the group consisting of: 2,2-diethoxyacetophenone; 2- or 3- or 4-bromoacetophenone; benzoin; benzophenone; 4-chlorobenzophenone; 4-phenylbenzophenone; benzoquinone; 1-chloroanthroquinone; p-diacetyl-benzene; 9,10-dibromoanthracene; 1,3-diphenyl-2-propanone; 1,4-naphthyl-phenyl ketone; 2,3-pentenedione; propiophenone; chlorothioxanthone; xanthone; fluorenone; and mixtures of two or more thereof.

12. A method of producing a release coated substrate which comprises applying a coating of the composition of claim 1 to a substrate; and curing the coating on the substrate by exposing the coating to radiation.

13. The method of claim 12 wherein the composition is cured with ultraviolet light.

14. A release-coated article comprising a substrate which has been coated with the release composition of claim 1 and which has been cured by exposure to radiation.

15. The release-coated article of claim 14 wherein the substrate is paper.

16. A multilayer article comprising (a) a first substrate;

(b) a second substrate;

(c) a release layer comprising the release composition of claim 1 which has been cured by exposure to radiation; and (d) a pressure-sensitive adhesive layer, wherein the release layer (c) is interposed between the first substrate and the layer of pressure-sensitive adhesive (d) and is adherent to the first substrate, and the pressure sensitive adhesive layer (d) is interposed between the release layer and the second substrate and is adherent to the second substrate.

17. The multilayer article of claim 16 wherein the first and second substrates are paper.

18. A radiation-curable release composition, comprising:

(A) an organopolysiloxane represented by the formula

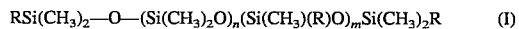

$$RSi(CH_3)_2-O-(Si(CH_3)_2O)_n(Si(CH_3)(R)O)_mSi(CH_3)_2R \qquad (I)$$

wherein in Formula (I), R is $-(CH_2)_6OC(O)CH=CH_2$; m is a number from about 2 to about 10; and n is a number from about 75 to about 125; and (B) an organosiloxane polymer represented by the formula

$$(R_3SiO)(Si(CH_3)_2O)_n(SiR_3) \qquad (II)$$

wherein in Formula (II), each R is independently a hydrocarbon group and n is a number in the range of about 1000 to about 20,000.

19. A radiation-curable release composition, comprising:

(A) an organopolysiloxane represented by the formula

$$RSi(CH_3)_2-O-(Si(CH_3)_2O)_n(Si(CH_3)(R)O)_mSi(CH_3)_2R \qquad (I)$$

wherein in Formula (I), R is $-(CH_2)_6OC(O)CH=CH_2$; m is about 6; and n is about 136; and (B) an organosiloxane polymer represented by the formula

$$(R_3SiO)(Si(CH_3)_2O)_n(SiR_3) \qquad (II)$$

wherein in Formula (II), each R is independently a hydrocarbon group and n is a number in the range of about 1000 to about 20,000.

20. A radiation-curable release composition, comprising:

(A) an organopolysiloxane represented by the formula

$$RSi(CH_3)_2-O-(Si(CH_3)_2O)_n(Si(CH_3)(R)O)_mSi(CH_3)_2R \qquad (I)$$

wherein in Formula (I), R is $-(CH_2)_6OC(O)CH=CH_2$; m is about 2; and n is about 100; and (B) an organosiloxane polymer represented by the formula

$$(R_3SiO)(Si(CH_3)_2O)_n(SiR_3) \qquad (II)$$

wherein in Formula (II), each R is independently a hydrocarbon group and n is a number in the range of about 1000 to about 20,000.

* * * * *